(12) United States Patent
Tanaka et al.

(10) Patent No.: US 7,167,223 B2
(45) Date of Patent: Jan. 23, 2007

(54) LIQUID CRYSTAL DISPLAY DEVICE

(75) Inventors: Toshiyuki Tanaka, Nara (JP); Ikuji Konishi, Nara (JP); Katsuhiro Kikuchi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/806,255

(22) Filed: Mar. 23, 2004

(65) Prior Publication Data

US 2004/0212764 A1    Oct. 28, 2004

(30) Foreign Application Priority Data

Apr. 24, 2003    (JP) .............................. 2003-119370

(51) Int. Cl.
*G02F 1/1335* (2006.01)

(52) U.S. Cl. ...................... 349/114; 349/106; 349/110

(58) Field of Classification Search ................ 349/114, 349/110, 106
See application file for complete search history.

(56) References Cited

U.S. PATENT DOCUMENTS

| | | | |
|---|---|---|---|
| 6,195,140 B1 * | 2/2001 | Kubo et al. .................... 349/44 |
| 6,219,118 B1 * | 4/2001 | Zhang ......................... 349/110 |
| 6,262,784 B1 | 7/2001 | Kim | |
| 6,295,109 B1 | 9/2001 | Kubo et al. | |
| 6,697,138 B1 * | 2/2004 | Ha et al. ..................... 349/114 |
| 6,885,418 B1 * | 4/2005 | Matsushita et al. ......... 349/113 |
| 7,030,948 B1 * | 4/2006 | Fujimori et al. ............ 349/114 |
| 2003/0063244 A1 | 4/2003 | Fujimori et al. | |
| 2003/0076464 A1 * | 4/2003 | Ozawa et al. ............... 349/113 |
| 2003/0117551 A1 | 6/2003 | Fujimori et al. | |
| 2004/0263702 A1 * | 12/2004 | Kim ........................... 349/38 |

FOREIGN PATENT DOCUMENTS

| | | |
|---|---|---|
| JP | 11-101992 | 4/1999 |
| KR | 1998-016974 | 6/1998 |

OTHER PUBLICATIONS

U.S. Appl. No. 10/689,086, filed Oct. 2003, Kikuchi et al.
Korean Office Action mailed Dec. 12, 2005.

* cited by examiner

*Primary Examiner*—David Nelms
*Assistant Examiner*—(Nancy) Thanh-Nhan Phan Nguyen
(74) *Attorney, Agent, or Firm*—Nixon & Vanderhye P.C.

(57) ABSTRACT

A transflective liquid crystal display panel, in which at least one of a pixel electrode substrate and a counter electrode substrate is provided with a protruding portion so that the thickness of a liquid crystal layer in a reflective region is smaller than that in a transmissive region, wherein a light-blocking section for shading a defective orientation domain formed by an insufficiently-rubbed portion around the protruding portion is formed simultaneously with, and using the same material as, another element such as a storage capacitor electrode section, a signal line or a scanning line. Thus, the decrease in the display quality due to the defective orientation domain can be suppressed without adding to the production process.

16 Claims, 12 Drawing Sheets

FIG. 3A
FIG. 3B  TaN/Ta/TaN film
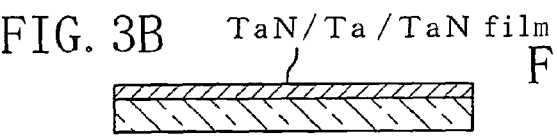
FIG. 3C  Photoresist film
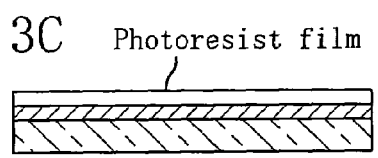
FIG. 3D  UV light  Photomask
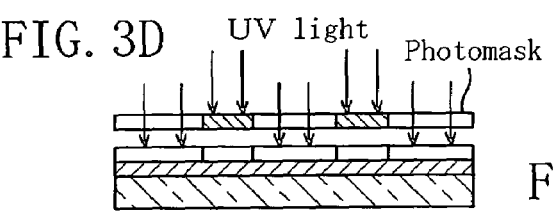
FIG. 3E
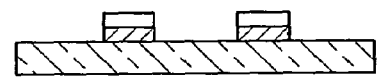
FIG. 3F  26c  29a
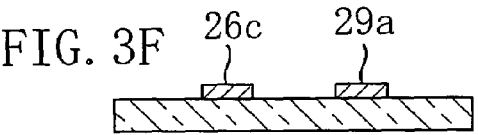
FIG. 3G  $Ta_2O_5$
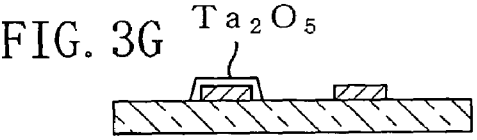
FIG. 3H  $Ta_2O_5$  26d
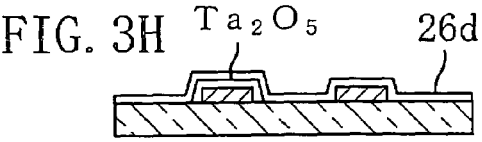
FIG. 3I  i layer  n⁺ layer  26d
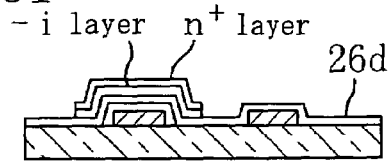
FIG. 3J  ITO film  Ta/TaN film  26d
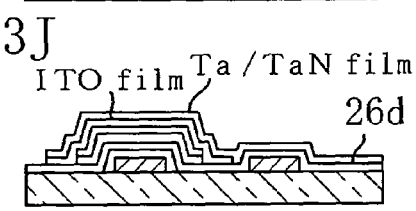
FIG. 3K  Ta/TaN film
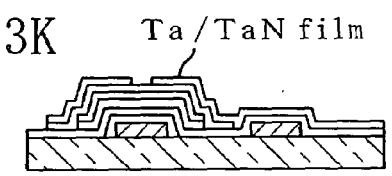
FIG. 3L  ITO film
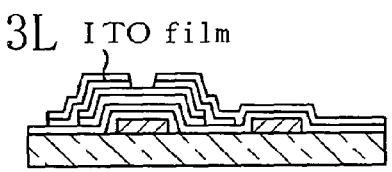
FIG. 3M  26a  26b  26
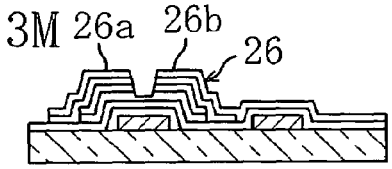
FIG. 3N  26a  27  26  26b  26d  23  26c  29a
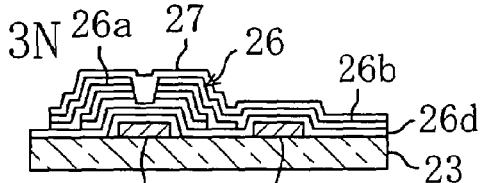

LIQUID CRYSTAL DISPLAY DEVICE

This nonprovisional application calims priority under 35 U.S.C. §119(a) on Patent Application No. 2003-119370 filed in Japan on Apr. 24, 2003, the entire contents of which are hereby incorporated by reference.

BACKGROUND OF THE INVENTION

1. Field of the Invention

The present invention relates to a liquid crystal display panel used in a transflective (or transreflective) liquid crystal display device.

2. Description of the Background Art

For their advantageous features such as a small thickness and a small power consumption, liquid crystal display devices have recently been widely used in various applications, including OA apparatuses such as word processors and personal computers, PDAs (personal digital assistances) such as electronic organizers, and monitors of camera-incorporated VTRs.

These liquid crystal display devices are generally classified into those of transmissive type and those of reflective type. Unlike CRTs (cathode ray tubes) or EL (electroluminescence) devices, liquid crystal display devices are not self-luminous. In a transmissive liquid crystal display device, an image is displayed by using light from an illuminator (so-called "backlight") provided on the back side of the liquid crystal display panel. In a reflective liquid crystal display device, an image is displayed by using ambient light.

Advantages and disadvantages of these types of liquid crystal display devices are as follows. A transmissive liquid crystal display device, which uses a backlight, is less influenced by the brightness of the environment, and is capable of displaying a bright image with a high contrast ratio. However, with the backlight, it consumes a large amount of power (the backlight accounts for about 50% or more of the total power consumption). Furthermore, the visibility lowers under a very bright environment (e.g., when used outdoors under a clear sky). Increasing the brightness of the backlight in order to maintain a sufficient visibility will further increase the power consumption. On the other hand, a reflective liquid crystal display device, which does not have a backlight, consumes little power, but the brightness and the contrast ratio thereof are substantially influenced by the conditions under which it is used, e.g., the brightness of the environment. Particularly, the visibility lowers significantly under dark environments.

In view of this, transflective liquid crystal display devices, which are capable of operating both in a transmissive mode and in a reflective mode, have been proposed in the art, in order to combine the advantages together while eliminating the disadvantages.

As schematically illustrated in the cross-sectional view of FIG. 12, a transflective liquid crystal display device includes, for each pixel, a reflective pixel electrode section 101 for reflecting ambient light coming from the upper side of the figure, and a transmissive pixel electrode section 102 for transmitting light from the backlight coming from the lower side of the figure. The transflective liquid crystal display device is capable of displaying an image by using both display modes, or by selectively using a transmissive display mode or a reflective display mode according to the environment under which it is used (e.g., the brightness of the environment). Thus, the transflective liquid crystal display device provides both the advantage of a reflective liquid crystal display device (low power consumption) and that of a transmissive liquid crystal display device (being less influenced by the brightness of the environment and being capable of displaying a bright image with a high contrast ratio). Furthermore, the disadvantage of a transmissive liquid crystal display device (the lowering of the visibility under a very bright environment) is suppressed.

Moreover, in a transflective liquid crystal display device as described above, the thickness of a liquid crystal layer 105 between a counter electrode substrate 103 and a pixel electrode substrate 104 needs to be such that the thickness Rd in a reflective region R is smaller than the thickness Td in a transmissive region T (e.g., about ½ of Td ($Rd \approx Td \times ½$)). Therefore, a protruding portion 106 is conventionally provided in the reflective region R of the pixel electrode substrate 104, and the reflective pixel electrode section 101 on the protruding portion 106, so that the thickness Rd of the liquid crystal layer 105 in the reflective region R is reduced by the thickness of the protruding portion 106 in the panel thickness direction, as described in U.S. Pat. No. 6,195,140 (Japanese Patent Application No. 11-101992), U.S. Pat. No. 6,295,109, United States Patent Application Publication No. 2003-0117551, U.S. patent application Ser. No. 10/260,248, U.S. patent application Ser. No. 10/689,086, etc.

SUMMARY OF THE INVENTION

In a liquid crystal display panel used in a transflective liquid crystal display device as described above, when the pixel electrode substrate 104 is subjected to a rubbing treatment, an insufficiently-rubbed portion S occurs around the protruding portion 106 (particularly, in a portion of the transmissive region T downstream (on the right hand side in FIG. 12) of the protruding portion 106 with respect to the rubbing direction). The term "upstream/downstream" will be used with respect to the rubbing direction throughout this specification unless otherwise specified. The insufficiently-rubbed portion S is shaded by the protruding portion 106 from the rubbing, and is not sufficiently rubbed, thereby providing a weak orientation-regulating force on liquid crystal molecules 105a.

Then, a region of the liquid crystal layer 105 corresponding to the insufficiently-rubbed portion S becomes a defective orientation domain that is visually perceived as a domain. Thus, the conventional arrangement has a problem that the display quality lowers especially in the transmissive display mode. Note that this problem occurs also when the protruding portion 106 is provided on the counter electrode substrate 103, instead of on the pixel electrode substrate 104.

This problem may be solved by providing a light-blocking portion for shading the defective orientation domain. However, the provision of such a light-blocking portion adds to the production process and may increase the production cost.

Therefore, it is an object of the present invention to provide a transflective liquid crystal display device, in which each pixel has a reflective region and a transmissive region, and at least one of the pixel electrode substrate and the counter electrode substrate is provided with a protruding portion so that the thickness of the liquid crystal layer in the reflective region is smaller than that in the transmissive region, wherein the decrease in the display quality due to a defective orientation domain formed by an insufficiently-rubbed portion around the protruding portion can be suppressed without adding to the production process.

In order to achieve this object, according to the present invention, when an element or elements of the transflective liquid crystal display device (such as a storage capacitor electrode section for storing a signal, which is formed so as to correspond to a pixel electrode section, or a signal line and a scanning line for applying a signal to the pixel electrode section) is or are formed, a light-blocking section is formed simultaneously with, and using the same material as, the element or elements, whereby it is possible to block a defective orientation domain formed by an insufficiently-rubbed portion around a protruding portion without adding to the production process.

Note that the light-blocking section may be formed through a step of forming another element using the same material as that of the other element, or may be formed through steps of forming different other elements using the same materials as those of the other elements.

Moreover, the light-blocking section may be an extension of, and integral with, the other element or elements, separate from the other element or elements, or a mix thereof.

BRIEF DESCRIPTION OF THE DRAWINGS

FIG. 3A to FIG. 3N are cross-sectional views schematically and sequentially illustrating the production steps up to the step of forming a protection layer on a TFT substrate.

DESCRIPTION OF THE PREFERRED EMBODIMENTS

Preferred embodiments of the present invention will now be described with reference to the drawings.

Embodiment 1

Figure 1:
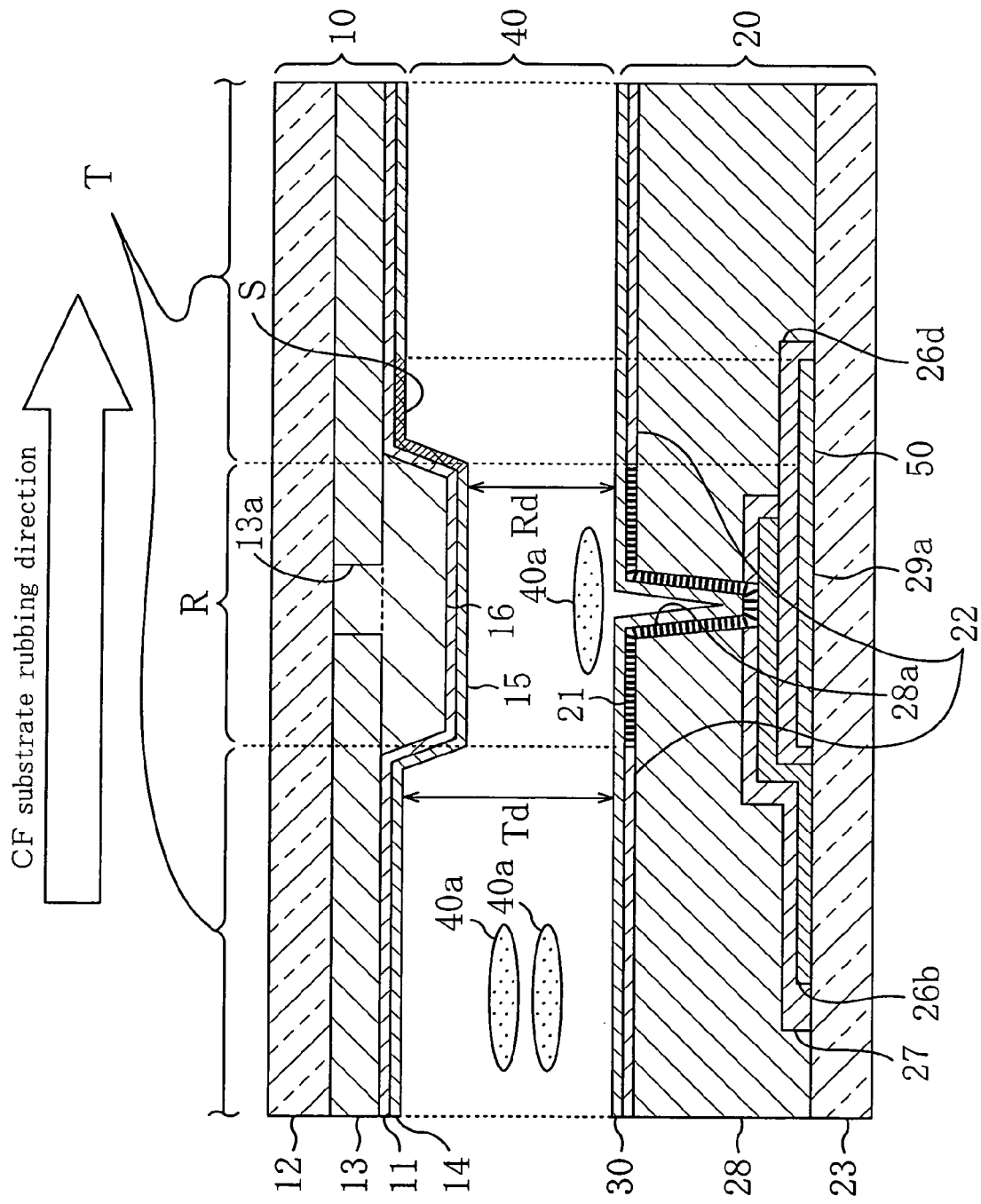
FIG. 1 is a cross-sectional view taken along line I—I of FIG. 2.
Figure 2:
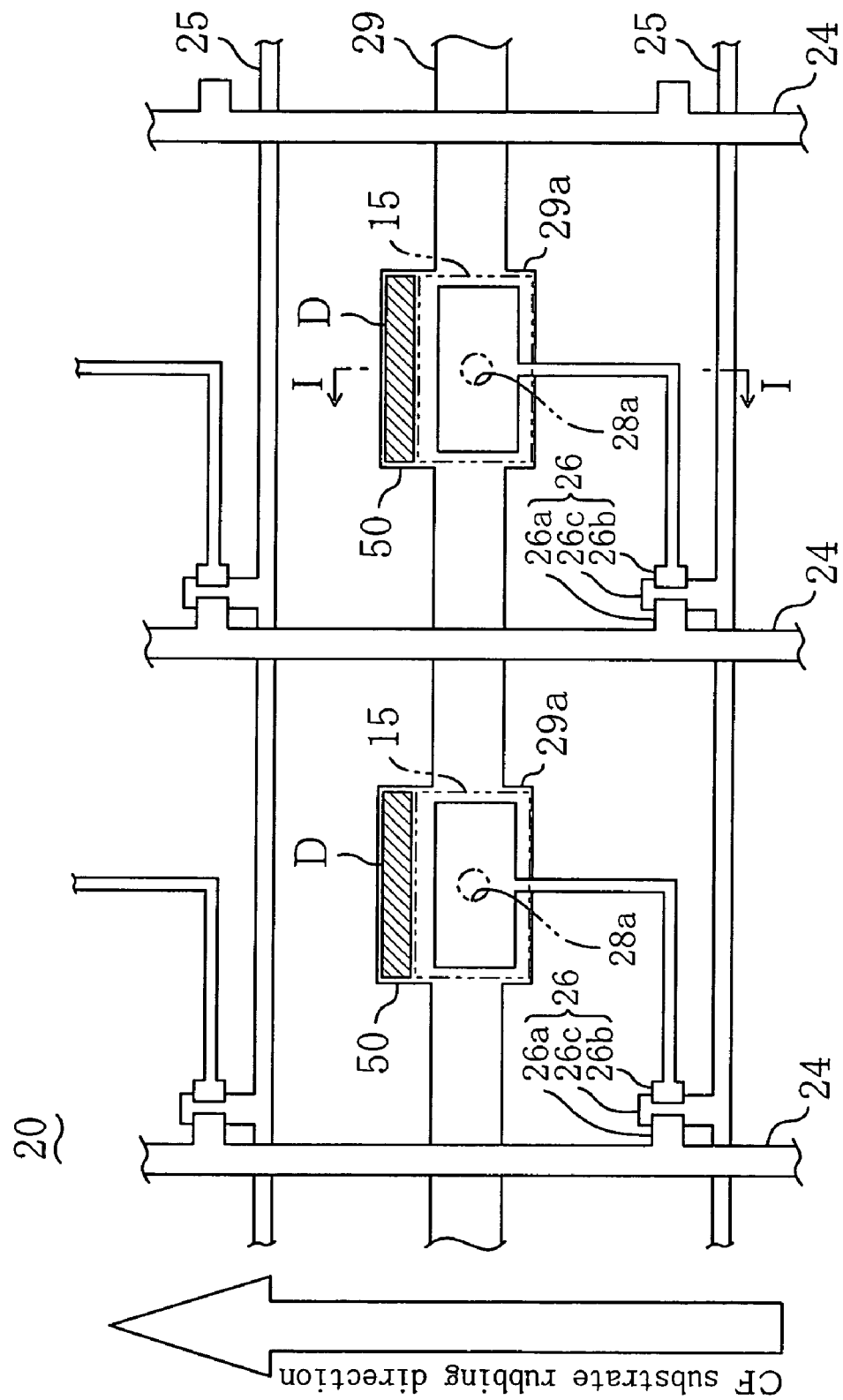
FIG. 2 is a plan view schematically illustrating an important part of a TFT substrate used in a liquid crystal display panel of a liquid crystal display device according to Embodiment 1 of the present invention.

FIG. 1 and FIG. 2 schematically illustrate an important part of a liquid crystal display panel of a transflective liquid crystal display device according to Embodiment 1 of the present invention. The liquid crystal display device displays an image using both the transmissive display mode and the reflective display mode. Note that FIG. 1 is a cross-sectional view taken along line I—I of FIG. 2, and FIG. 2 is a schematic plan view of a pixel electrode substrate as seen from the counter electrode substrate side.

The liquid crystal display panel of the liquid crystal display device includes a TFT substrate 20 as the pixel electrode substrate, and a color filter substrate 10 (hereinafter referred to as a "CF substrate") as the counter electrode substrate. The TFT substrate 20 includes a reflective pixel electrode section 21 (not shown in FIG. 2) and a transmissive pixel electrode section 22 (not shown in FIG. 2) for each pixel. The CF substrate 10 includes a counter electrode section 11, which is arranged so as to oppose the reflective pixel electrode section 21 and the transmissive pixel electrode section 22 for each pixel in the TFT substrate 20. In the TFT substrate 20, the reflective pixel electrode section 21 is arranged in a central portion of the pixel, and the transmissive pixel electrode section 22 is arranged in a peripheral portion of the pixel so as to surround the reflective pixel electrode section 21. In the CF substrate 10, the counter electrode section 11 extends over a plurality of pixels. A liquid crystal layer 40 is provided between the substrates 20 and 10. The liquid crystal display panel operates in an ECB (Electrically Controlled Birefringence) mode, wherein incident light is selectively transmitted or blocked by utilizing the birefringence of liquid crystal molecules 40a of the liquid crystal layer 40 while changing the orientation of the liquid crystal molecules 40a by the application of an electric field. The liquid crystal display panel includes a backlight (not shown) on the TFT substrate 20 side (the lower side in FIG. 1).

The TFT substrate 20 includes a transparent substrate 23 made of an electrically insulative, transparent material such as a glass. A plurality of signal lines 24 and a plurality of scanning lines 25 are arranged on the transparent substrate 23 so as to cross each other in a lattice pattern defining a matrix of pixels therein for applying a signal to the reflective pixel electrode section 21 and the transmissive pixel electrode section 22 of each pixel. A TFT 26 (Thin Film Transistor) is provided in the vicinity of the intersection between each signal line 24 and each scanning line 25. Each TFT 26 includes a source electrode 26a, a drain electrode 26b and a gate electrode 26c, and a gate insulating film 26d is provided between the source and drain electrodes 26a and 26b and the gate electrode 26c. The signal line 24 and the scanning line 25 are electrically connected to the source electrode 26a and the gate electrode 26c, respectively. Moreover, the drain electrode 26b extends to a central portion of the pixel, and the drain electrode 26b and the source electrode 26a are covered by a protection layer 27.

An insulating layer 28 is provided over the signal line 24, the scanning line 25 and the TFT 26, and the reflective pixel electrode section 21 and the transmissive pixel electrode section 22 are provided on the insulating layer 28. A contact hole 28a is running in the thickness direction through the insulating layer 28 in a portion of the insulating layer 28 that opposes a central portion of the reflective pixel electrode section 21 in the panel thickness direction. The reflective pixel electrode section 21 is electrically connected to the drain electrode 26b of the TFT 26 via the contact hole 28a. On the transparent substrate 23 side of the insulating layer 28, a capacitor electrode line 29 extends parallel to the scanning line 25. A storage capacitor electrode section 29a (hereinafter referred to as a "Cs electrode section") for storing a signal is formed along the capacitor electrode line 29 so as to oppose the reflective pixel electrode section 21 in the panel thickness direction. Note that the gate insulating film 26d of the TFT 26 extends over the storage capacitor electrode line 29 and the Cs electrode section 29a.

The reflective pixel electrode section 21 is made of a light-reflecting metal film such as an aluminum (Al) film. On the other hand, the transmissive pixel electrode section 22 is made of a light-transmitting transparent conductive film such as an ITO (Indium Tin Oxide) film. A side surface of the transmissive pixel electrode section 22 is electrically connected to a side surface of the reflective pixel electrode section 21. An alignment film 30, which has been rubbed in a predetermined direction, is provided over the reflective pixel electrode section 21 and the transmissive pixel electrode section 22, whereby the liquid crystal molecules 40a in the vicinity of the interface between the TFT substrate 20 and the liquid crystal layer 40 are aligned in the predetermined direction and parallel to the TFT substrate 20. Note that while the reflective metal film of the reflective pixel electrode section 21 and the transparent conductive film of the transmissive pixel electrode section 22 are connected to each other with the side surfaces thereof abutting each other in the present embodiment, they may alternatively be connected to each other with an end portion of the reflective metal film and an end portion of the transparent conductive film overlap each other. Alternatively, the transparent conductive film of the transmissive pixel electrode section 22 may be extended to the reflective pixel electrode section 21, while arranging a reflective metal film over the extended portion of the transparent conductive film, thereby providing the reflective pixel electrode section 21.

The CF substrate 10 also includes a transparent substrate 12 made of an electrically insulative, transparent material such as a glass. On the liquid crystal layer 40 side of the transparent substrate 12, a color filter layer 13 is provided for each pixel. An opening 13a is running in the thickness direction through the color filter layer 13 in a portion of the color filter layer 13 that opposes a central portion of the reflective pixel electrode section 21 in the panel thickness direction, and the counter electrode section 11 is provided on the color filter layer 13. The counter electrode section 11 is also made of a transparent conductive film such as an ITO film, as is the transmissive pixel electrode section 22. Moreover, an alignment film 14, which has been rubbed in a predetermined direction indicated by an arrow in FIG. 1 and FIG. 2 (the rightward direction in FIG. 1 and the upward direction in FIG. 2), is provided on the counter electrode section 11, whereby the liquid crystal molecules 40a in the vicinity of the interface between the CF substrate 10 and the liquid crystal layer 40 are aligned in the predetermined direction (the rubbing direction) and parallel to the CF substrate 10.

In each pixel, a region corresponding to the reflective pixel electrode section 21 is the reflective region R, where light entering the liquid crystal display panel from the CF substrate 10 side (the upper side in FIG. 1) is reflected by the reflective pixel electrode section 21 out of the liquid crystal display panel through the CF substrate 10 in the reflective display mode. On the other hand, a region corresponding to the transmissive pixel electrode section 22 is the transmissive region T, where light from the backlight entering the liquid crystal display panel from the TFT substrate 20 side (the lower side in FIG. 1) is transmitted out of the liquid crystal display panel through the CF substrate 10 in the transmissive display mode.

In the present embodiment, the CF substrate 10 is provided with a protruding portion 15 for each pixel so that the thickness Rd of the liquid crystal layer 40 in the reflective region R is smaller than the thickness Td of the liquid crystal layer 40 in the transmissive region T (Rd<Td). With the protruding portions 15, the CF substrate 10 has a so-called "multigap structure". Note that the phantom line in FIG. 2 schematically shows the contour of the top surface of the protruding portion 15.

Specifically, the protruding portion 15 is formed by a transparent layer 16. The transparent layer 16 is provided between the color filter layer 13 and the counter electrode section 11 in the reflective region R so as to raise a portion of the counter electrode section 11 in the reflective region R in the panel thickness direction toward the reflective pixel electrode section 21 (in the downward direction in FIG. 1). The shape and size of the top surface of the protruding portion 15 are generally the same as those of the reflective pixel electrode section 21.

The protruding portion 15 is formed by the transparent layer 16, as described above, thereby avoiding a decrease in the optical transmittance in the reflective region R, which occurs when a protruding portion is formed by increasing the thickness of the color filter layer 13. Furthermore, the opening 13a of the color filter layer 13 is filled with a portion of the transparent layer 16, whereby it is possible to increase the optical transmittance in the reflective region R without substantially detracting from the function of the color filter layer 13 by the provision of the opening 13a, as compared with a case where the color filter layer 13 has no opening 13a. Note that the method of forming the transparent layer 16 as described above may include, for example, forming a film of a negative-type transparent acrylic-resin photosensitive material on the transparent substrate 12, exposing the film to activation light in a predetermined pattern, developing the film with an alkaline developing solution and washing the film with water to remove the unexposed portions, and then subjecting the film to a heat treatment. Alternatively, it may be provided by patterning by etching, printing, transferring, etc.

In the present embodiment, the Cs electrode section 29a is extended downstream of the protruding portion 15, as illustrated in FIG. 1 and FIG. 2, so as to shade a defective orientation domain D formed by the insufficiently-rubbed portion S downstream (on the right hand side in FIG. 1 and on the upper side in FIG. 2) of the protruding portion 15 on the CF substrate 10. The extended portion forms a light-blocking section 50 of the present invention. Note that a portion upstream (on the left hand side in FIG. 1 and on the lower side in FIG. 2) of the protruding portion 15 is less likely to be an insufficiently-rubbed portion. Therefore, the upstream end of the Cs electrode section 29a is generally aligned with the upstream end of the protruding portion 15 with respect to the rubbing direction.

The process of producing the liquid crystal display panel having such a structure, up to the step of forming the protection layer 27 on the TFT substrate 20, will now be described with reference to FIG. 3A to FIG. 3N.

Step 1

The transparent substrate 23 is washed (see FIG. 3A).

Step 2

A TaN/Ta/TaN film is deposited by sputtering on the transparent substrate 23, as illustrated in FIG. 3B, in order to form the scanning line 25, the gate electrode 26c, the capacitor electrode line 29, and the Cs electrode section 29a including the light-blocking section 50, which is formed as an extended portion of the Cs electrode section 29a.

Step 3

A photoresist film is deposited on the TaN/Ta/TaN film, as illustrated in FIG. 3C.

Step 4

The photoresist film is irradiated with UV light via a photomask (see FIG. 3D). The photomask used in this step is patterned so that the light-blocking portions thereof correspond to the shapes of the scanning line 25, the gate electrode 26c, the capacitor electrode line 29 and the Cs electrode section 29a. The light-blocking portion corresponding to each Cs electrode section 29a is extended by a predetermined amount in the downstream direction so as to form two light-blocking sections 50 and 50.

Step 5

Unnecessary portions of the TaN/Ta/TaN film are removed by dry etching using a mixed gas of $CF_4$ and $O_2$, as illustrated in FIG. 3E. Thus, the scanning line 25, the gate electrode 26c, the capacitor electrode line 29, the Cs electrode section 29a and the light-blocking section 50 are formed. Therefore, the light-blocking section 50 is formed during the step of forming the scanning line 25 and the Cs electrode section 29a by using the same material as that of the scanning line 25 and the Cs electrode section 29a.

Step 6

The remaining resist film is stripped, as illustrated in FIG. 3F.

Step 7

The surface of the gate electrode 26c is oxidized by an anodic oxidation method to produce $Ta_2O_5$ (see FIG. 3G).

Step 8

The gate insulating film 26d (e.g., an SiNx film) is deposited substantially across the entire surface by a plasma CVD method (see FIG. 3H).

Step 9

An amorphous silicon $^-$i layer is formed by a plasma CVD method on a portion of the gate insulating film 26d corresponding to the gate electrode 26c (see FIG. 3I).

Step 10

An amorphous silicon $n^+$ layer is formed by a plasma CVD method on the amorphous silicon $^-$i layer.

Step 11

The $n^+$ layer and the $^-$i layer are simultaneously patterned by dry etching.

Step 12

An ITO film is deposited by sputtering on the amorphous silicon $n^+$ layer, and a Ta/TaN film is deposited by sputtering on the ITO film, as illustrated in FIG. 3J.

Step 13

The Ta/TaN film is patterned by dry etching to form the signal line 24, as illustrated in FIG. 3K.

Step 14

The ITO film formed in Step 12 is patterned by wet etching, as illustrated in FIG. 3L.

Step 15

The $n^+$ layer is divided by dry etching into two pieces, one on the source electrode 26a side and another on the drain electrode 26b side. In this step, a portion of the $^-$i layer is also etched away. After this step, the source electrode 26a and the drain electrode 26b of the TFT 26 are completed, as illustrated in FIG. 3M.

Step 16

An SiNx film for forming the protection layer 27 is formed by a plasma CVD method, as illustrated in FIG. 3N.

Step 17

The SiNx film is patterned by wet etching to form the protection layer 27.

Through Steps 1 to 17 above, the TFT 26, the signal line 24, the scanning line 25, the capacitor electrode line 29, the Cs electrode section 29a and the light-blocking section 50 are formed on the transparent substrate 23. Thus, in the present embodiment, the light-blocking section 50 can be formed only by changing the photomask in Step 4. Then, the insulating layer 28, the reflective and transmissive pixel electrode sections 21 and 22 and the alignment film 30 are formed sequentially, thereby obtaining the TFT substrate 20.

The following experiments were conducted for examining the relationship between the thickness Wd of the transparent layer 16 (the height of the protruding portion 15) and the size in the rubbing direction of the defective orientation domain D formed by the insufficiently-rubbed portion S in the downstream vicinity of the protruding portion 15 in the liquid crystal display panel of the liquid crystal display device having such a structure.

In Experiments 1 to 3, three liquid crystal display panels were produced, each having a different thickness Wd of the transparent layer 16 according to the thicknesses Rd and Td of the liquid crystal layer 40 in the reflective region R and the transmissive region T. For each liquid crystal display panel produced, the size in the rubbing direction of the defective orientation domain D was measured.

In Experiment 1, the thicknesses Rd and Td of the liquid crystal layer 40 in the reflective region R and the transmissive region T were set to Rd=2.5 μm and Td=5.0 μm, respectively. Thus, the thickness Wd of the transparent layer 16 was Wd=2.5 μm (=5.0−2.5).

In Experiment 2, the thicknesses Rd and Td of the liquid crystal layer 40 in the reflective region R and the transmissive region T were set to Rd=3.0 μm and Td=4.0 μm, respectively. Thus, the thickness Wd of the transparent layer 16 was Wd=1.0 μm (=4.0−3.0).

In Experiment 3, the thicknesses Rd and Td of the liquid crystal layer 40 in the reflective region R and the transmissive region T were set to Rd=2.0 μm and Td=5.5 μm, respectively. Thus, the thickness Wd of the transparent layer 16 was Wd=3.5 μm (=5.5−2.0).

The results are shown in Table 1 below (unit: μm).

TABLE 1

|  | Thickness Rd in reflective region | Thickness Td in transmissive region | Height Wd of protruding portion | Dimension M of defective orientation domain |
| --- | --- | --- | --- | --- |
| Experiment 1 | 2.5 | 5.0 | 2.5 | 2.0 |
| Experiment 2 | 3.0 | 4.0 | 1.0 | 1.0 |
| Experiment 3 | 2.0 | 5.5 | 3.5 | 3.0 |

As shown in Table 1 above, the size M in the rubbing direction of the defective orientation domain D was 2.0 μm, 1.0 μm and 3.0 μm in Experiments 1, 2 and 3, respectively. Therefore, it can be seen that the amount of extension of the Cs electrode section 29a in the downstream direction, i.e., the size M in the rubbing direction of the light-blocking section 50, needs to be 1 μm or more (M≧1 μm).

Thus, the present embodiment provides a transflective liquid crystal display device, in which each pixel has the reflective region R and the transmissive region T, and a plurality of protruding portions 15 are provided on the CF substrate 10 so that each protruding portion 15 corresponds to the reflective region R, whereby the thickness Rd of the liquid crystal layer 40 in the reflective region R is smaller than the thickness Td of the liquid crystal layer 40 in the transmissive region T. When forming the Cs electrode section 29a on the TFT substrate 20, the Cs electrode section 29a is extended in the downstream direction. In this way, the light-blocking section 50 for shading the defective orientation domain D formed by the insufficiently-rubbed portion S in the downstream vicinity of each protruding portion 15 on the CF substrate 10 can be formed simultaneously with, and using the same material as, the Cs electrode section 29a. Thus, the decrease in the display quality in the transmissive display mode due to the defective orientation domain D can be suppressed without adding to the process of producing a liquid crystal display panel.

Note that in the present embodiment, the reflective pixel electrode section 21 and the transmissive pixel electrode section 22 are electrically connected to each other, so that an image can be displayed by using both the transmissive display mode and the reflective display mode. Alternatively, the reflective pixel electrode section 21 and the transmissive pixel electrode section 22 may not be connected to each other, and a signal from the signal line 24 may be supplied selectively to the reflective pixel electrode section 21 or the transmissive pixel electrode section 22, so that an image can be displayed by selectively using the transmissive display mode or the reflective display mode.

Moreover, while the present embodiment is directed to a color liquid crystal display device, the present invention may alternatively be applied to a black-and-white liquid crystal display device.

Embodiment 2

Figure 4:
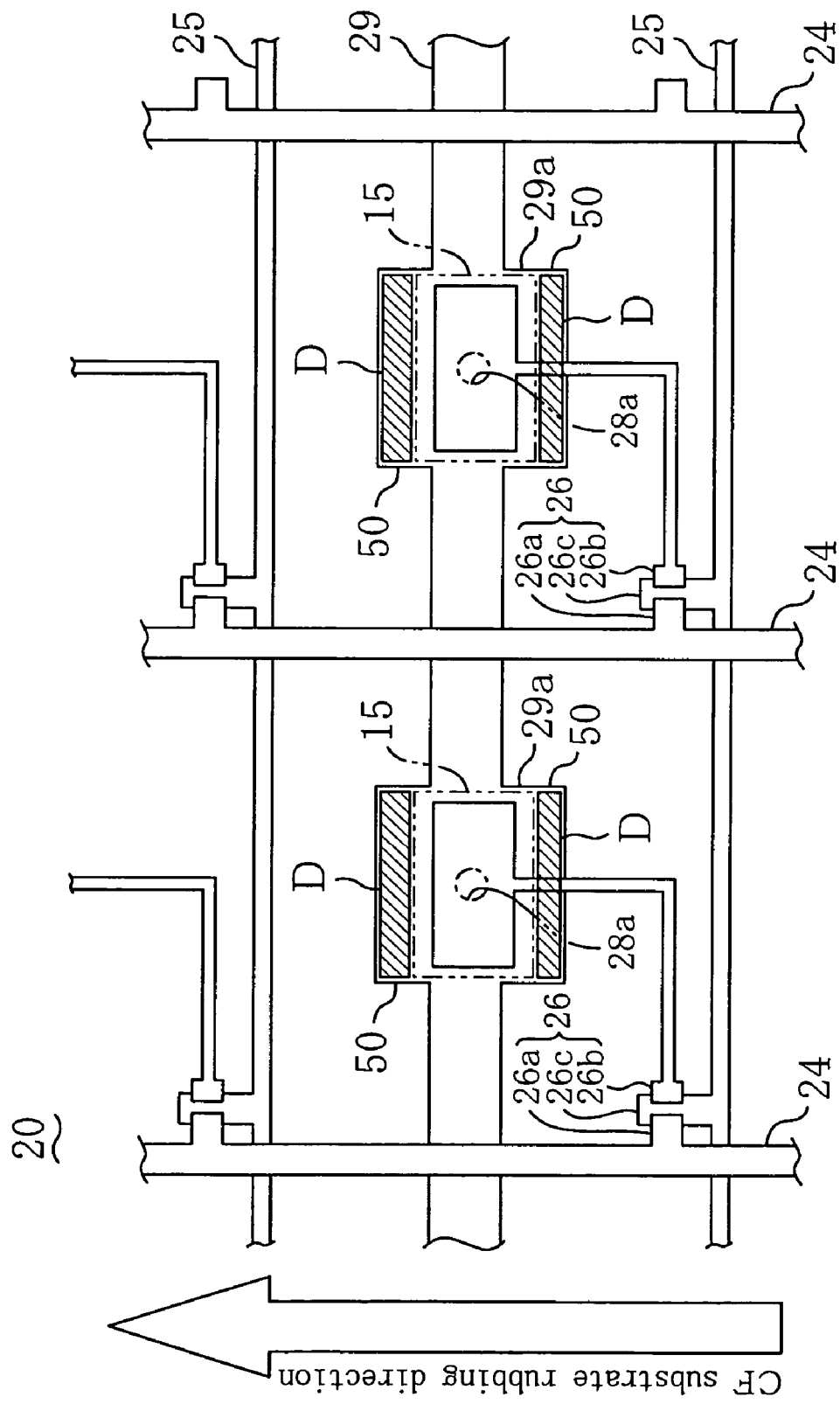
FIG. 4 is a view similar to FIG. 2, schematically illustrating an important part of a TFT substrate used in a liquid crystal display panel of a liquid crystal display device according to Embodiment 2 of the present invention.

FIG. 4 is a plan view illustrating an important part of a liquid crystal display panel of a liquid crystal display device according to Embodiment 2 of the present invention. Note that those elements already described in Embodiment 1 are denoted by the same reference numerals.

In the present embodiment, the Cs electrode section 29a is extended in the upstream direction (the downward direction in FIG. 4), in addition to being extended in the downstream direction (the upward direction in FIG. 4) as in Embodiment 1. The extended portion in the upstream direction forms the light-blocking section 50 for shading the defective orientation domain D formed by the insufficiently-rubbed portion S in the upstream vicinity of each protruding portion 15 on the CF substrate 10. Other than this, the present embodiment has the same structure as that of Embodiment 1, which will not be further described below.

The structure of the present embodiment is based on the fact that when rubbing the substrate having the protruding portions 15 (the CF substrate 10 in the present embodiment), although the insufficiently-rubbed portion S typically occurs downstream of the protruding portion 15, it may also occur upstream of the protruding portion 15. The structure of the present embodiment allows for designs with greater margins with respect to the defective orientation domain D formed by the insufficiently-rubbed portion S around the protruding portion 15.

Thus, according to the present embodiment, although the size of the transmissive region T is reduced as compared with Embodiment 1, it is possible to further suppress the decrease in the display quality in the transmissive display mode due to the defective orientation domain D formed by the insufficiently-rubbed portion S around the protruding portion 15.

Note that in the present embodiment, the Cs electrode section 29a is extended downstream and upstream of the protruding portion 15. However, an insufficiently-rubbed portion may also occur beside the protruding portion 15, i.e., in locations neighboring the protruding portion 15 in a direction perpendicular to the rubbing direction and parallel to the substrate plane, although not as often as those occurring in the downstream vicinity and the upstream vicinity of the protruding portion 15. Thus, the Cs electrode section 29a may be extended not only in the upstream/downstream directions, but also in the lateral directions as described above. In this way, it is possible to substantially completely shade defective orientation domains formed by insufficiently-rubbed portions around the protruding portion 15.

Embodiment 3

Figure 5:
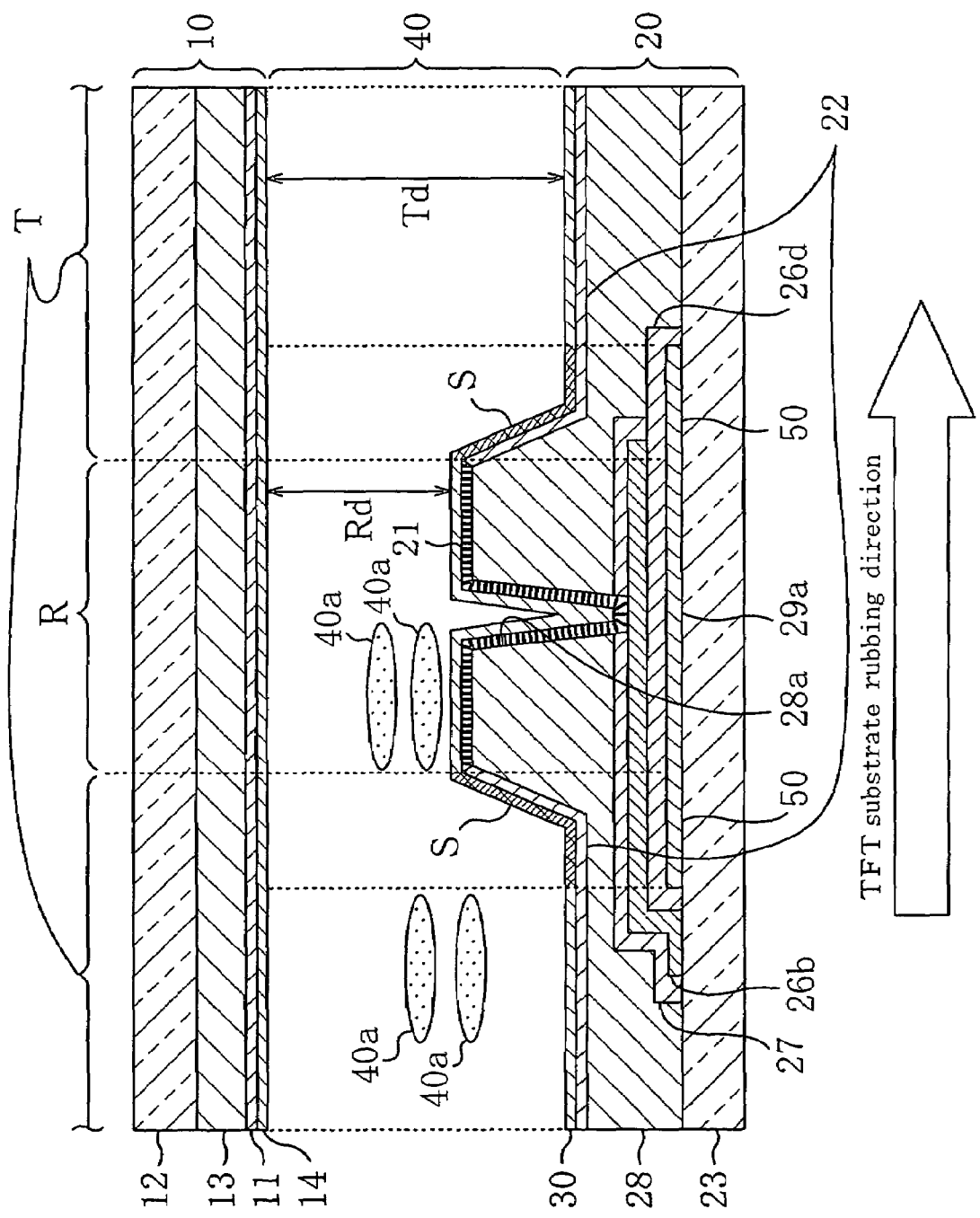
FIG. 5 is a view similar to FIG. 1, schematically illustrating an important part of a liquid crystal display panel of a liquid crystal display device according to Embodiment 3 of the present invention.

FIG. 5 is a cross-sectional view schematically illustrating a liquid crystal display panel of a liquid crystal display device according to Embodiment 3 of the present invention. Note that those elements already described in Embodiment 1 are denoted by the same reference numerals.

As in Embodiments 1 and 2, the liquid crystal display panel of this liquid crystal display device includes the TFT substrate 20 and the CF substrate 10, wherein the TFT substrate 20 includes the reflective pixel electrode section 21 and the transmissive pixel electrode section 22 for each pixel, and the CF substrate 10 includes the counter electrode section 11, which is arranged so as to oppose the reflective pixel electrode section 21 and the transmissive pixel electrode section 22 of the TFT substrate 20.

The present embodiment differs from Embodiments 1 and 2 in that the protruding portions 15 are formed on the TFT substrate 20, instead of on the CF substrate 10. Therefore, the surface of the CF substrate 10 closer to the liquid crystal layer 40 is flat.

The liquid crystal layer 40 has the same thickness as that of the embodiments above. Specifically, the height of the protruding portion 15 is determined so that the thickness Rd in the reflective region R corresponding to the reflective pixel electrode section 21 is about one half of the thickness Td in the transmissive region T corresponding to the transmissive pixel electrode section 22 (Rd≈Td/2) in each pixel.

Moreover, the Cs electrode section 29a is extended in the downstream direction (the rightward direction in FIG. 5) and in the upstream direction (the leftward direction in FIG. 5), as in Embodiment 2. These two extended portions form two light-blocking sections 50, one for shading the defective orientation domain D formed by the insufficiently-rubbed portion S in the downstream vicinity of the protruding portion 15 and another for shading the defective orientation domain D formed by the insufficiently-rubbed portion S upstream of the protruding portion 15. Other than this, the present embodiment has the same structure as those of Embodiments 1 and 2, which will not be further described below.

Thus, according to the present embodiment, similar effects to those of Embodiment 2 can be provided also when the protruding portions 15 forming a multigap structure are provided on the TFT substrate 20.

Note that in the present embodiment, the Cs electrode section 29a is extended downstream and upstream of the protruding portion 15. Alternatively, the Cs electrode section 29a may be extended only in the downstream direction as in Embodiment 1, or may be extended in the lateral directions beside the protruding portion 15 in addition to the downstream/upstream directions as described above as a variation of Embodiment 2.

Embodiment 4

Figure 6:
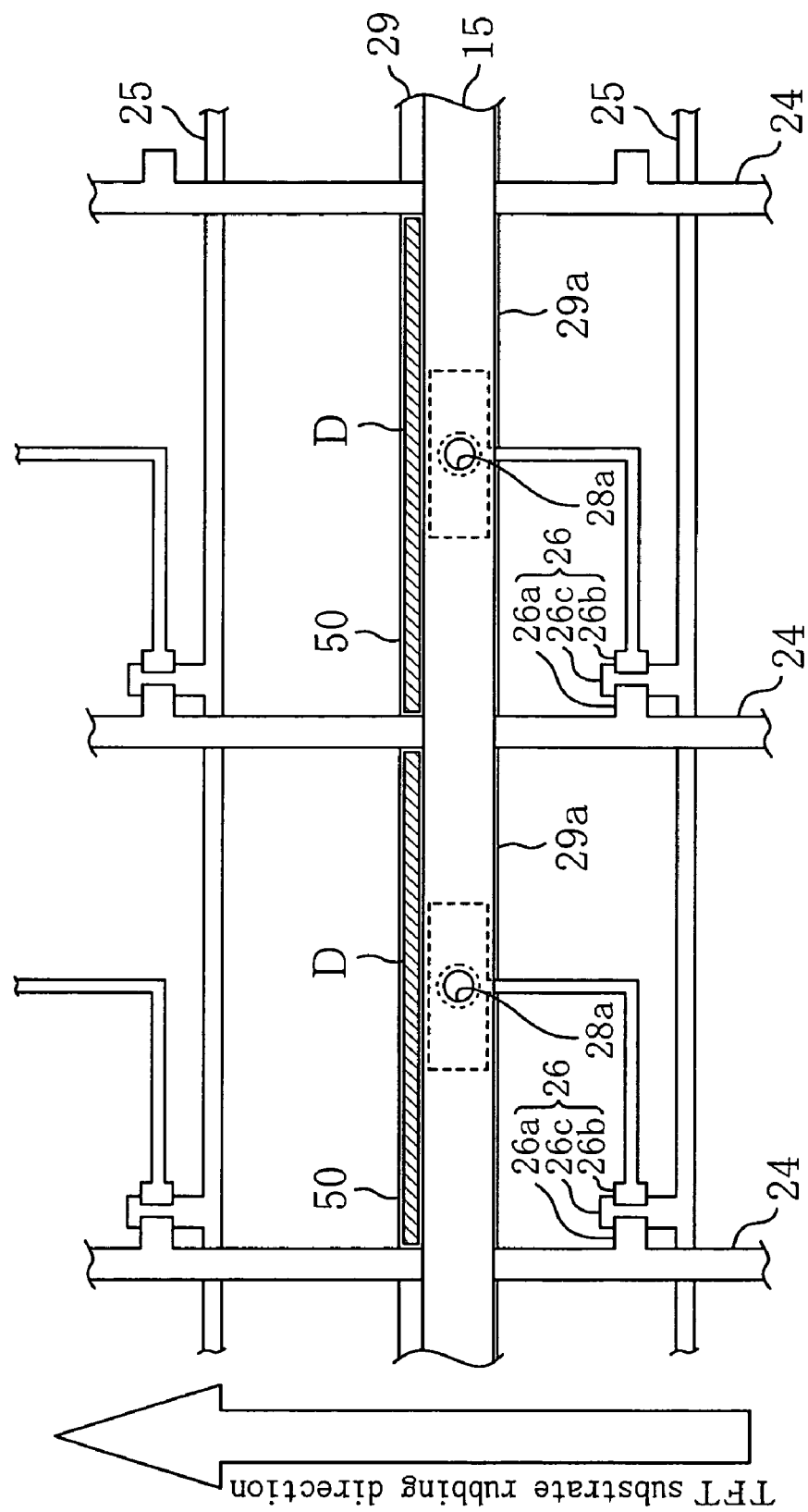
FIG. 6 is a view similar to FIG. 2, schematically illustrating an important part of a TFT substrate used in a liquid crystal display panel of a liquid crystal display device according to Embodiment 4 of the present invention.

FIG. 6 is a plan view schematically illustrating an important part of a liquid crystal display panel of a liquid crystal display device according to Embodiment 4 of the present invention. Note that those elements already described in Embodiments 1 to 3 are denoted by the same reference numerals.

In the present embodiment, the protruding portions 15 are provided on the TFT substrate 20 so as to run across a plurality of pixels in the scanning line direction (in the horizontal direction in FIG. 6). Each reflective pixel electrode section 21 is also running across a plurality of pixels in the scanning line direction on the top surface of the corresponding protruding portion 15.

Thus, while the protruding portions 15 are arranged in an island-like pattern so that each separate protruding portion 15 corresponds to one pixel in Embodiments 1 to 3, the protruding portions 15 are arranged in stripes so that each separate protruding portion 15 continuously extends across a plurality of pixels in the present embodiment. Accordingly, the entire portion of the capacitor electrode line 29 located within a pixel is widened in the signal line direction (in the vertical direction in FIG. 6) to form the Cs electrode section 29a.

In the present embodiment, the Cs electrode section 29a is extended downstream of the protruding portion 15 (in the upward direction in FIG. 6), as in Embodiment 1. The extended portion forms the light-blocking section 50 for shading the defective orientation domain D formed by the insufficiently-rubbed portion S in the downstream vicinity of the protruding portion 15. Other than this, the present embodiment has the same structure as that of Embodiment 1, which will not be further described below.

Thus, similar effects to those of Embodiment 1 can also be provided by the present embodiment.

Figure 7:
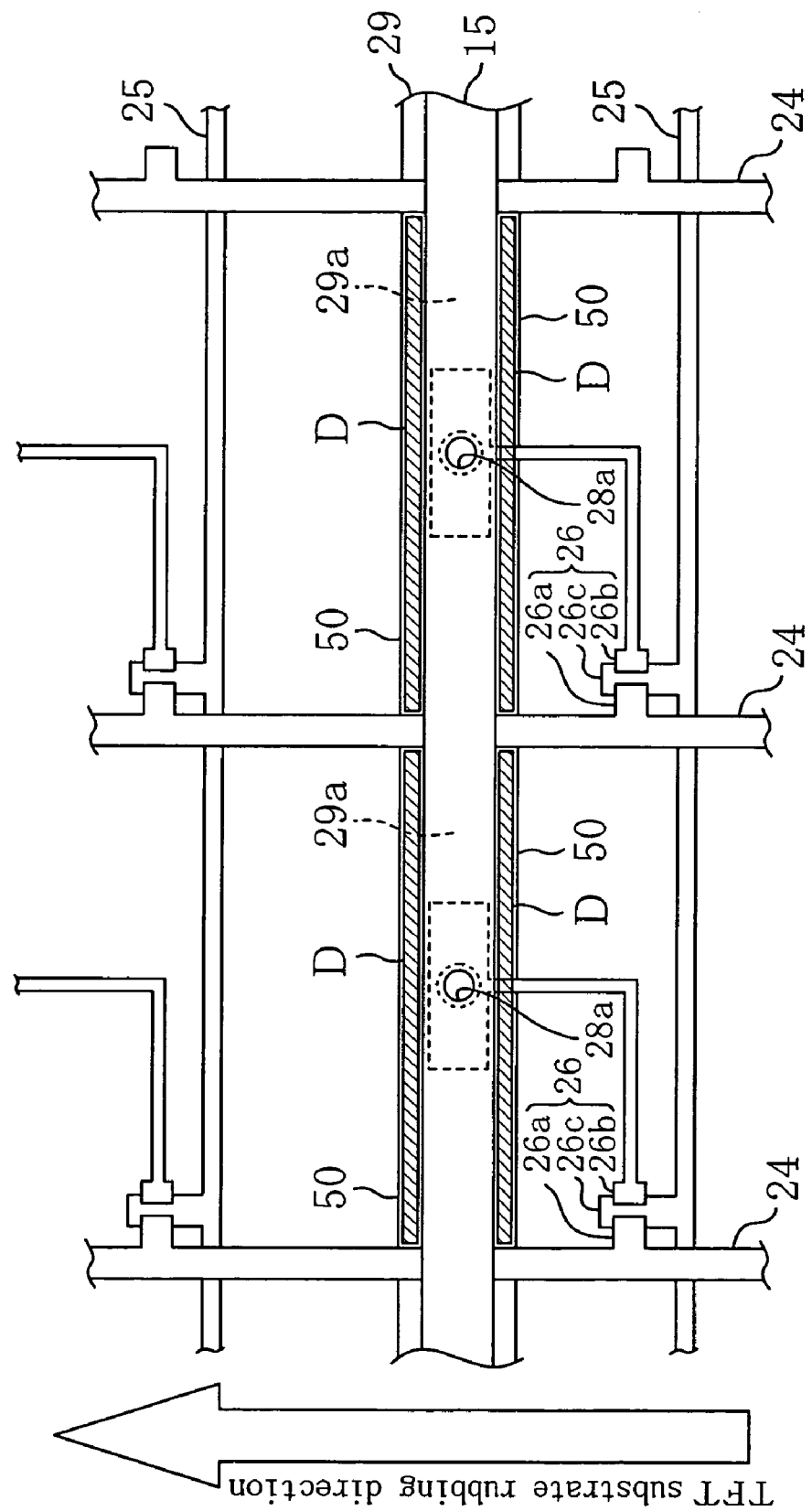
FIG. 7 is a view similar to FIG. 2, illustrating a variation of Embodiment 4.

Note that in the present embodiment, the Cs electrode section 29a is only extended downstream of the protruding portion 15. Alternatively, as shown in the variation of FIG. 7, the Cs electrode section 29a may be extended upstream of the protruding portion 15 (in the downward direction in FIG. 7), in addition to being extended downstream of the protruding portion 15 (in the upward direction in FIG. 7) to form the light-blocking sections 50 upstream and downstream of the protruding portion 15, as in Embodiment 2.

Embodiment 5

Figure 8:
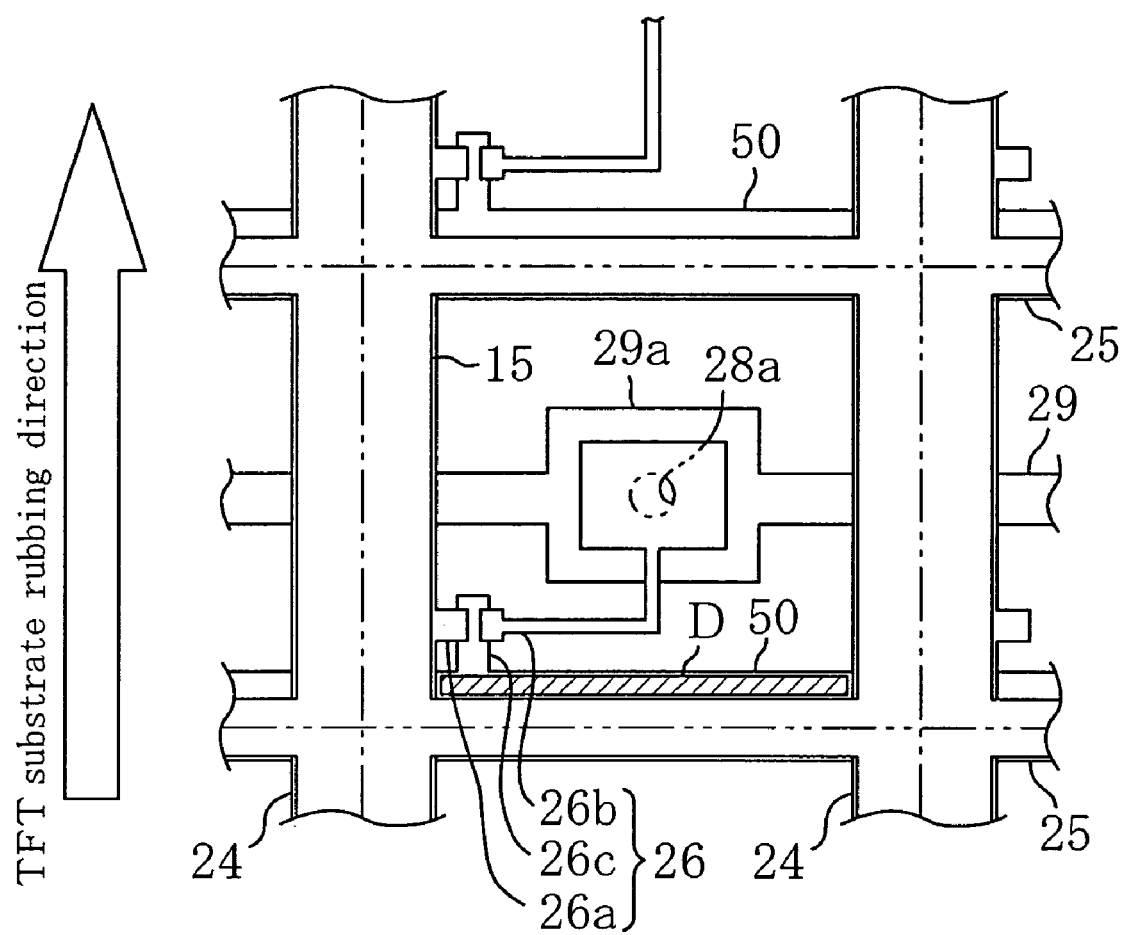
FIG. 8 is a view similar to FIG. 2, schematically illustrating an important part of a TFT substrate used in a liquid crystal display panel of a liquid crystal display device according to Embodiment 5 of the present invention.

FIG. 8 is a plan view schematically illustrating an important part of a liquid crystal display panel of a liquid crystal display device according to Embodiment 5 of the present invention. Note that those elements already described in Embodiment 1 are denoted by the same reference numerals.

In the present embodiment, the reflective pixel electrode section 21 has an open rectangular shape, and is arranged on the TFT substrate 20 along the periphery of each pixel, whereas the transmissive pixel electrode section 22 has a solid rectangular shape and is arranged in a central portion of each pixel so as to be surrounded by the reflective pixel electrode section 21.

Accordingly, the protruding portion 15 as viewed in a plan view has an open rectangular shape, conforming to the planar shape of the reflective pixel electrode section 21, and is arranged in a peripheral portion of each pixel. Thus, the protruding portions 15, 15, . . . , are arranged in a lattice pattern defining a matrix of pixels therein, as are the signal line 24 and the scanning line 25, and as opposed to the island-like pattern of Embodiments 1 to 3 or the stripe pattern of Embodiment 4.

In the present embodiment, one of two adjacent scanning lines 25 and 25 that is located on the upstream side (the lower side in FIG. 8) is extended in the downstream direction (the upward direction in FIG. 8), and the extended portion forms the light-blocking section 50 for shading the defective orientation domain D formed by the insufficiently-rubbed portion S in the downstream vicinity of one of the four sides of the protruding portion 15 that extends in a direction perpendicular to the rubbing direction on the upstream side of the pixel. Other than this, the present embodiment has the same structure as that of Embodiment 1, which will not be further described below.

In this arrangement, the protruding portion 15 is relatively shifted from the scanning line 25 in the direction (the downward direction in FIG. 8) opposite to the rubbing direction, so that the light-blocking section 50, which is an extended portion of the scanning line 25, is located in the downstream vicinity of the upstream side of the protruding portion 15.

Thus, the same effects as those of Embodiment 1 can also be provided by the present embodiment.

Note that in the present embodiment, one of the four lines (two signal lines 24 and two scanning lines 25) surrounding each pixel, i.e., the upstream-side scanning line 25, is extended in the downstream direction. Alternatively, in order to shade a defective orientation domain formed by an insufficiently-rubbed portion in the upstream vicinity of the downstream side of the protruding portion 15, the downstream-side scanning line 25 may be extended in the upstream direction. Alternatively, in order to additionally shade defective orientation domains formed by insufficiently-rubbed portions beside the protruding portion 15, i.e., those neighboring the protruding portion 15 in a direction perpendicular to the rubbing direction and parallel to the substrate plane, the remaining two of the four lines surrounding each pixel, i.e., two signal lines 24, may be extended in the respective lateral directions.

Figure 9:
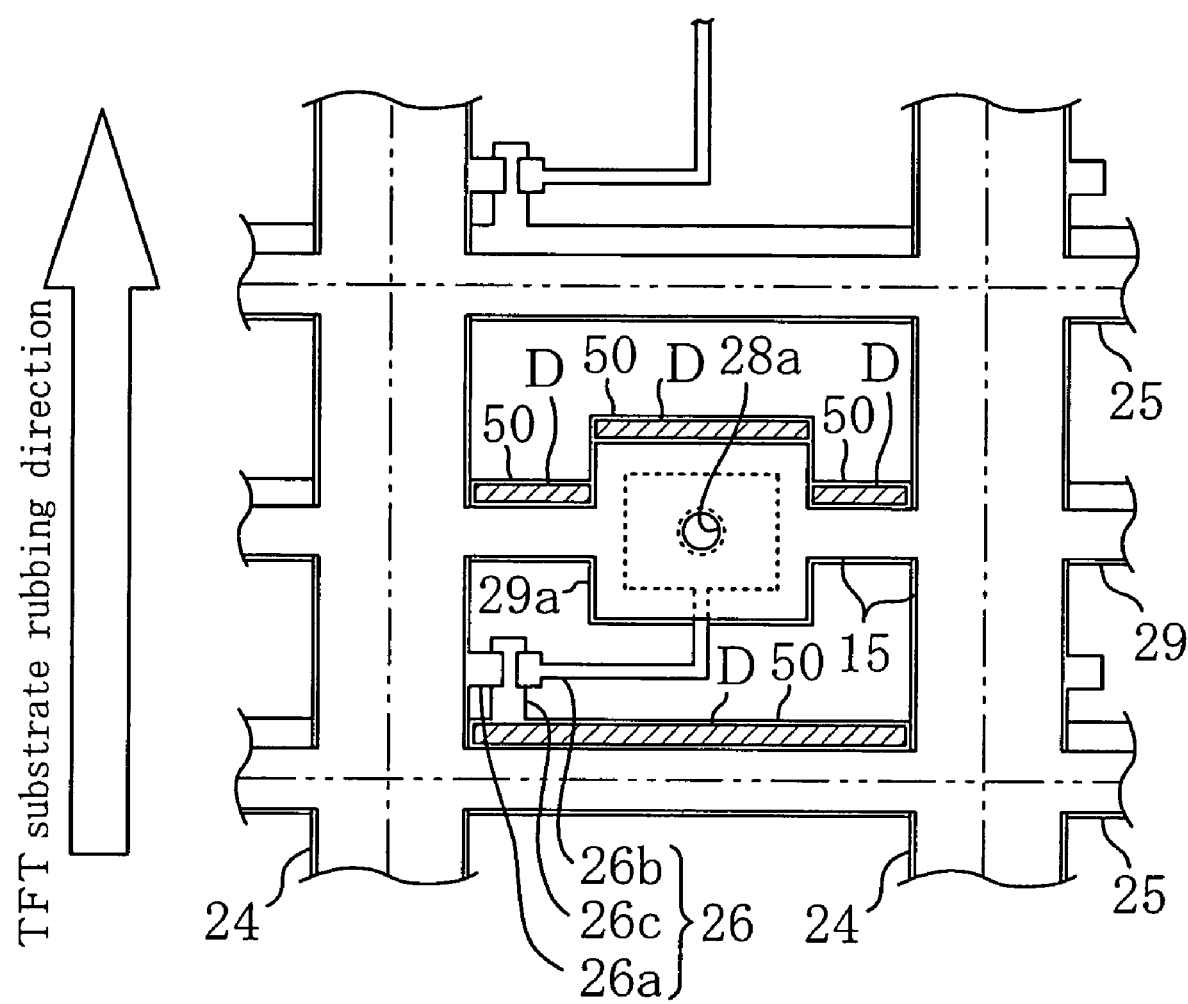
FIG. 9 is a view similar to FIG. 2, illustrating a variation of Embodiment 5.

Moreover, while the present embodiment is directed to an arrangement where the reflective pixel electrode section 21 and the protruding portion 15 are provided only in a peripheral portion of each pixel, the present invention may alternatively be applied to an arrangement where they are provided not only in a peripheral portion but also in a central portion of each pixel, as shown in the variation of FIG. 9. Such an arrangement can be accommodated by using the light-blocking sections of the previous embodiments (i.e., by extending the Cs electrode section 29a to form the light-blocking section 50). Thus, where the light-blocking section 50 is formed to be integral with another element, the light-blocking section 50 may be formed simultaneously with, and using the same material as, a selected one of a plurality of elements including the signal line 24, the scanning line 25 and the Cs electrode section 29a, and the selection can appropriately be made in view of the location where the defective orientation domain is formed.

Embodiment 6

Figure 10:
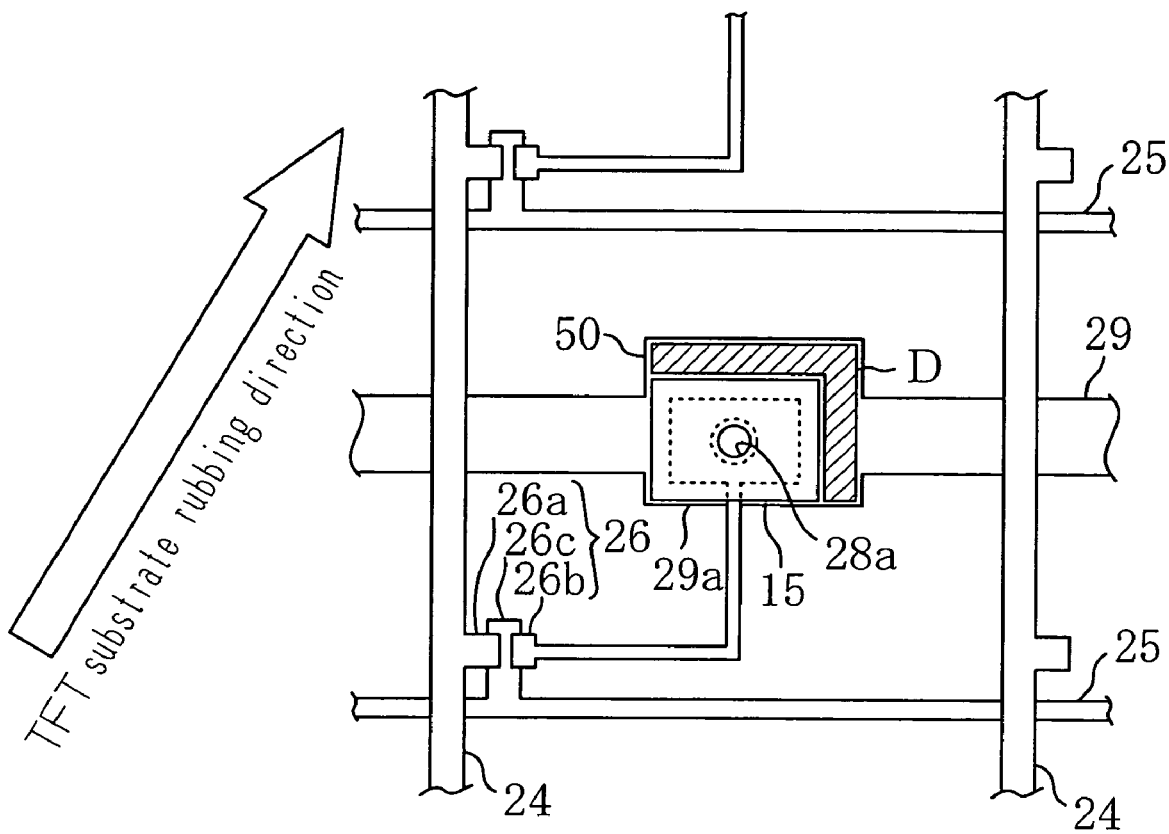
FIG. 10 is a view similar to FIG. 2, schematically illustrating an important part of a TFT substrate used in a liquid crystal display panel of a liquid crystal display device according to Embodiment 6 of the present invention.

FIG. 10 is a plan view schematically illustrating an important part of a liquid crystal display panel of a liquid crystal display device according to Embodiment 6 of the present invention. Note that those elements already described in Embodiments 1 to 5 are denoted by the same reference numerals.

In the present embodiment, the protruding portions 15 each have a generally rectangular shape, and are arranged in an island-like pattern on the TFT substrate 20 so that each protruding portion 15 is located in a central portion of a pixel. The present embodiment differs from Embodiments 1 to 5 in that the rubbing direction for the TFT substrate 20 is not parallel to the signal line 24, but is at a predetermined angle θ (0°<θ<90°) with respect to the signal line 24. Thus, where the Cs electrode section 29a has a generally rectangular shape, two of the four sides of the Cs electrode section 29a are present on the downstream side.

In the present embodiment, the two sides of the Cs electrode section 29a are extended in the downstream direction respectively along the signal line 24 and along the scanning line 25. The extended portion having a planar L-letter shape forms the light-blocking section 50 for shading the defective orientation domain D formed by the insufficiently-rubbed portion S occurring in the downstream vicinity of the protruding portion 15.

Figure 11:
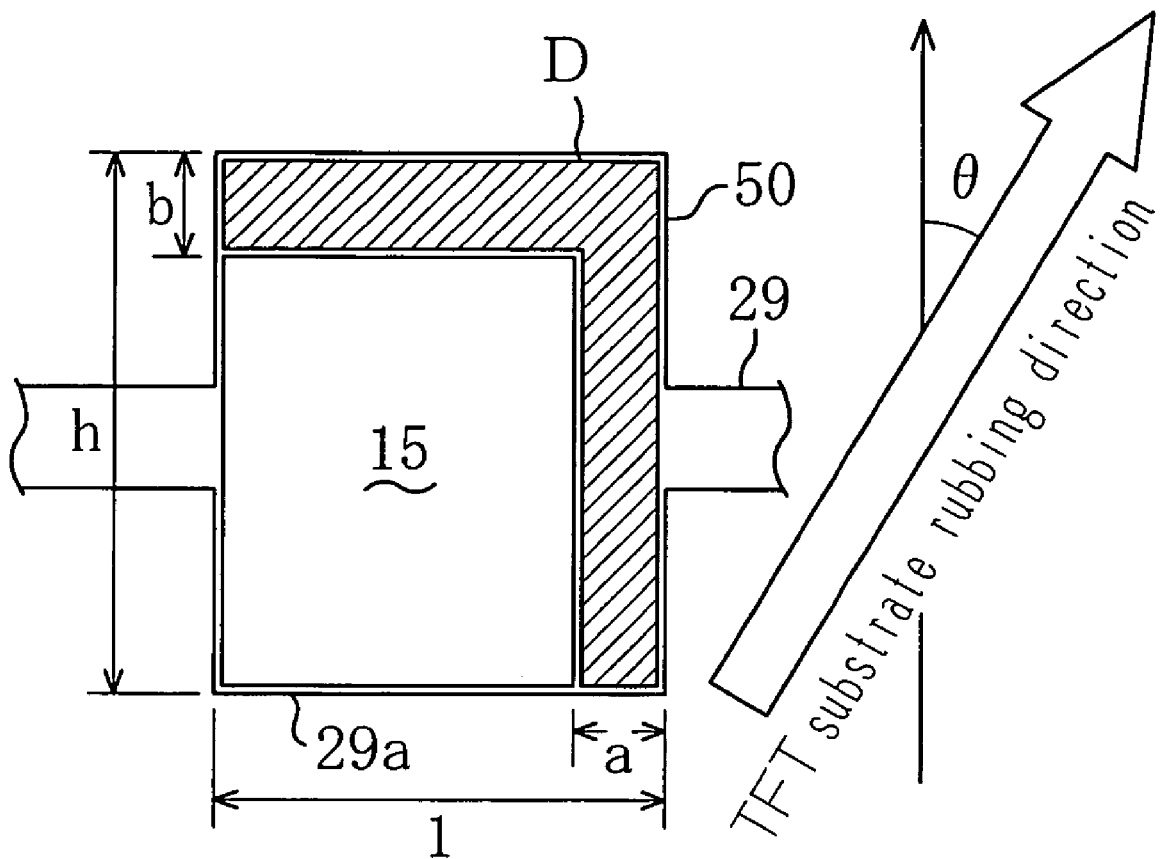
FIG. 11 is a diagram used for calculating the amount of extension of a Cs electrode section in the scanning line direction and that in the signal line direction.
Figure 12:
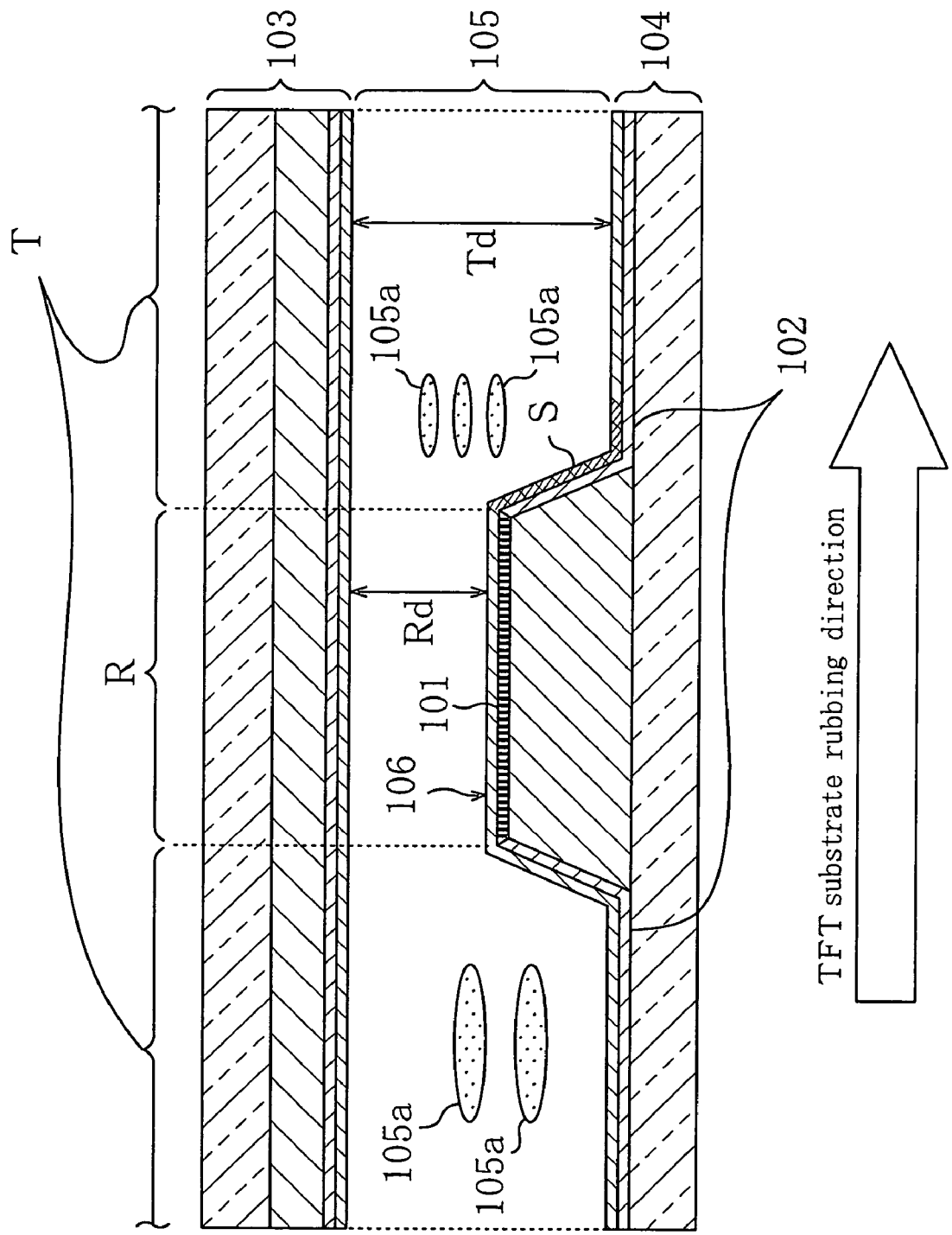
FIG. 12 is a view similar to FIG. 1, schematically illustrating an important part of a liquid crystal display panel of a conventional liquid crystal display device.

Now, the area P of the Cs electrode section 29a including the extended portion thereof (the light-blocking section 50) will be discussed with reference to FIG. 11. Where "j" and "k" denote the length (unit: μm) of the Cs electrode section 29a in the scanning line direction (in the horizontal direction in FIG. 10) and that in the signal line direction (in the vertical direction in FIG. 10), respectively, the area P' of the Cs electrode section 29a itself is:

$P' = j \times k$.

The amount of extension (unit: μm) of the Cs electrode section 29a in the scanning line direction and that in the signal line direction can be obtained as follows. As can be seen from the results shown in Table 1 above, the size in the rubbing direction of the defective orientation domain D is at least 1 μm. Therefore, the amount of extension in the scanning line direction is at least:

$1 \times \sin \theta = \sin \theta$, and the amount of extension in the signal line direction is at least:

$1 \times \cos \theta = \cos \theta$.

Thus, the area P of the Cs electrode section 29a including the light-blocking section 50 is at least:

$P = (j + \sin \theta) \times (k + \cos \theta)$ (where 0°<θ<90°).

Note that in a case where the reflective pixel electrode section 21 and the protruding portion 15 are arranged in a stripe pattern, running across a plurality of pixels, with the capacitor electrode line 29 being widened across its entire length to form the Cs electrode section 29a, as in Embodiment 4, the Cs electrode section 29a can be extended by cos θ in the downstream direction along the signal line.

Thus, according to the present embodiment, similar effects to those of Embodiments 1 to 5 can also be provided when the rubbing direction is not parallel to the signal line direction.

Note that in the present embodiment, the amount of extension of the Cs electrode section 29a is calculated based on the relationship between the rubbing direction and the signal line direction. Alternatively, the amount of extension may be calculated based on the relationship between the rubbing direction and the scanning line direction.

Moreover, while Embodiments 1 to 6 above are directed to arrangements where the Cs electrode section 29a, the scanning line 25 and/or the signal line 24 is extended to form the light-blocking section 50, the protruding portion 15 may be shrunk so that a portion of the Cs electrode section 29a, the scanning line 25 or the signal line 24 that is no longer covered by the shrunk protruding portion 15 functions as the light-blocking section 50.

Moreover, while the light-blocking section 50 is formed to be integral with another element such as the Cs electrode section 29a, the scanning line 25 or the signal line 24 in Embodiments 1 to 6 above, the light-blocking section 50 may alternatively be separate from the other element as long as it is formed simultaneously with, and using the same material as, the other element.

Furthermore, while the embodiments above are directed to suppressing the decrease in the display quality in the transmissive display mode due to the defective orientation domain D formed in the transmissive region T, the present invention is not limited to this. In a case where a defective orientation domain is formed in the reflective region R, the light-blocking section 50 can be formed from a material with a low optical reflectivity, e.g., a black conductive material, whereby it is possible to suppress the reflection of incident light in the defective orientation domain D, and thus it is possible to suppress the decrease in the display quality in the reflective display mode due to the defective orientation domain D formed in the reflective region R.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A liquid crystal display device, comprising:
 a pixel electrode substrate including a transmissive pixel electrode section and a reflective pixel electrode section corresponding to one pixel;
 a counter electrode substrate including a counter electrode section and arranged so as to oppose the pixel electrode substrate; and
 a liquid crystal layer arranged between the pixel electrode substrate and the counter electrode substrate, wherein:
 the pixel includes a transmissive region corresponding to at least part of the transmissive pixel electrode section and a reflective region corresponding to at least part of the reflective pixel electrode section;
 at least one of the pixel electrode substrate and the counter electrode substrate includes a protruding portion provided so that a thickness of the liquid crystal layer in at least part of the reflective region is smaller than that in the transmissive region;
 one surface of the at least one of the pixel electrode substrate and the counter electrode substrate that is closer to the liquid crystal layer is subjected to a rubbing treatment in a predetermined direction;
 the liquid crystal display device includes a light-blocking section;
 the light-blocking section is formed using the same material as one or more other elements of the liquid crystal display device; and wherein the light-blocking section includes one or more pieces, and the light-blocking section is asymmetric with respect to the protruding portion so that a downstream rubbing direction edge of the light-blocking section is located further from an adjacent edge of the protruding portion than is an upstream rubbing direction edge of the light-blocking section which may or may not extend beyond an adjacent different edge of the protruding portion.

2. The liquid crystal display device of claim 1, wherein: the pixel electrode substrate includes a storage capacitor electrode section that forms a storage capacitor together with the reflective pixel electrode section of the pixel; and the light-blocking section is formed simultaneously with, and using the same material as, the storage capacitor electrode section.

3. The liquid crystal display device of claim 1, wherein: the pixel electrode substrate includes a line for applying an electric potential to the transmissive pixel electrode section and the reflective pixel electrode section of the pixel; and the light-blocking section is formed simultaneously with, and using the same material as, the line.

4. The liquid crystal display device of claim 1, wherein: the pixel electrode substrate includes a storage capacitor electrode section that forms a storage capacitor together with the reflective pixel electrode section of the pixel, and a line for applying an electric potential to the transmissive pixel electrode section and the reflective pixel electrode section of the pixel;

a portion of the light-blocking section is formed simultaneously with, and using the same material as, the storage capacitor electrode section; and the remaining portion of the light-blocking section is formed simultaneously with, and using the same material as, the line.

5. The liquid crystal display device of claim 1, wherein the light-blocking section is provided so as to shade a defective orientation domain formed in a downstream vicinity of the protruding portion with respect to the rubbing direction.

6. The liquid crystal display device of claim 5, wherein the light-blocking section is provided so as to additionally shade a defective orientation domain formed in an upstream vicinity of the protruding portion with respect to the rubbing direction.

7. The liquid crystal display device of claim 6, wherein the protruding portion is formed so as to extend across the pixel in a direction not parallel to the rubbing direction and parallel to a substrate plane.

8. The liquid crystal display device of claim 6, wherein the light-blocking section is provided so as to additionally shade defective orientation domains formed beside the protruding portion.

9. The liquid crystal display device of claim 1, wherein the light-blocking section shades a defective orientation domain formed in an area in the liquid crystal layer.

10. The liquid crystal display device of claim 1, wherein an opening is provided in a color filter layer of the counter electrode substrate, the opening in the color filter layer being provided in the reflective region, and wherein the light-blocking section covers the entire opening in the color filter layer in the reflective region.

11. The liquid crystal display device of claim 1, wherein the light-blocking section includes multiple light-blocking pieces.

12. A liquid crystal display device, comprising:
a pixel electrode substrate including a transmissive pixel electrode section and a reflective pixel electrode section corresponding to one pixel;
a counter electrode substrate including a counter electrode section and arranged so as to oppose the pixel electrode substrate; and
a liquid crystal layer arranged between the pixel electrode substrate and the counter electrode substrate, wherein:
the pixel includes a transmissive region corresponding to at least part of the transmissive pixel electrode section and a reflective region corresponding to at least part of the reflective pixel electrode section;
at least one of the pixel electrode substrate and the counter electrode substrate includes a protruding portion provided so that a thickness of the liquid crystal layer in at least part of the reflective region is smaller than that in the transmissive region;
the liquid crystal display device includes a light-blocking section;
the light-blocking section is formed using the same material as one or more other elements of the liquid crystal display device; and
wherein an opening is provided in a color filter layer of the counter electrode substrate, the opening in the color filter layer being provided in the reflective region, and wherein the light-blocking section covers the entire opening in the color filter layer in the reflective region.

13. The liquid crystal display device of claim 12, wherein the light-blocking section shades a defective orientation domain formed in an area in the liquid crystal layer.

14. The liquid crystal display device of claim 12, wherein: the pixel electrode substrate includes a storage capacitor electrode section that forms a storage capacitor together with the reflective pixel electrode section of the pixel; and the light-blocking section is formed simultaneously with, and using the same material as, the storage capacitor electrode section.

15. The liquid crystal display device of claim 12, wherein: the pixel electrode substrate includes a line for applying an electric potential to the transmissive pixel electrode section and the reflective pixel electrode section of the pixel; and the light-blocking section is formed simultaneously with, and using the same material as, the line.

16. The liquid crystal display device of claim 12, wherein the light-blocking section includes multiple light-blocking pieces.

* * * * *

UNITED STATES PATENT AND TRADEMARK OFFICE
CERTIFICATE OF CORRECTION

PATENT NO. : 7,167,223 B2
APPLICATION NO. : 10/806255
DATED : January 23, 2007
INVENTOR(S) : Tanaka et al.

It is certified that error appears in the above-identified patent and that said Letters Patent is hereby corrected as shown below:

On the Title page: Item (56), References Cited, under OTHER PUBLICATIONS, please correct the following information:

"Korean Office Action mailed Dec. 12, 2005."

should read

--Korean Office Action mailed Dec. 9, 2005.--

Signed and Sealed this
Twenty-sixth Day of February, 2013

Teresa Stanek Rea
*Acting Director of the United States Patent and Trademark Office*